April 20, 1926.
W. PROCKNOW
REPAIR STAND
Filed June 22, 1922
1,581,360
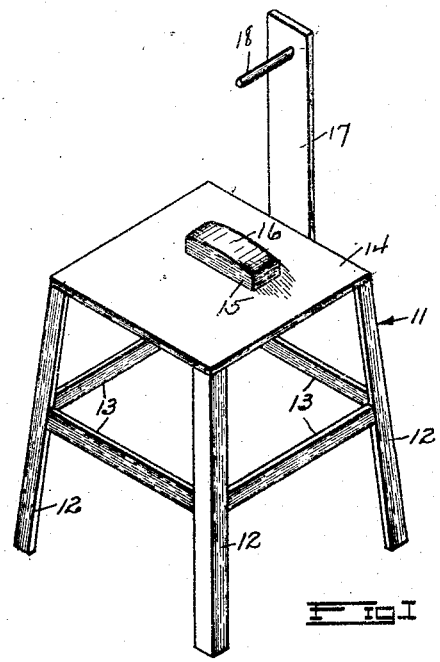
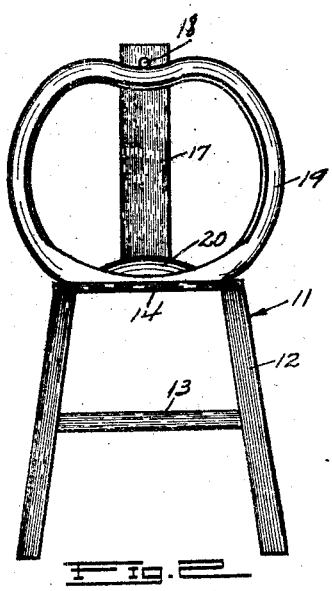
WILLIAM PROCKNOW
INVENTOR
BY
ATTORNEY Patented Apr. 20, 1926.

1,581,360

UNITED STATES PATENT OFFICE.

WILLIAM PROCKNOW, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

REPAIR STAND.

Application filed June 22, 1922. Serial No. 570,126.

*To all whom it may concern:*

Be it known that I, WILLIAM PROCKNOW, a citizen of the United States, and a resident of Milwaukee, in the county of Milwaukee and State of Wisconsin, have invented certain new and useful Improvements in Repair Stands, of which the following is a specification.

Upon inspection of tires as they come from the curing room it is found that a small percentage have slight defects on the inside of the carcass which must be repaired before the tire can be sold to advantage. Many devices have been constructed to spread the beads so as to give access to the inside of the carcass to facilitate the repairing but most of these are either complicated or unhandy to work with. I have constructed simple means for overcoming these difficulties and in the drawing accompanying this specification and forming a part thereof I have shown, for purpose of illustration, one form which my invention may assume. In the drawings:

Figure 1 is a perspective view of this illustrative embodiment, while

Figure 2 is a side elevation of this illustrative embodiment showing a tire in position to be repaired.

The device herein disclosed comprises a frame 11 having uprights 12 carrying cross-braces 13 and a table 14 which supports a block 15 having an annular face 16 and also supports an upright 17 carrying a pin 18 near its upper extremity.

In using this device the carcass 19 is placed in position with the defective part 20 lying on the block 15 and then pressed down and held in distorted position by the pin 18 to thus expose the defective part.

While I have shown a specific embodiment of my invention, it will be understood that the disclosure herein is illustrative only and my invention is not limited thereto.

I claim:

1. A device for repairing tires comprising means to distort the tire to expose the defective portion and means engaging the tire to hold it in distorted position, said last named means engaging the tire at a point substantially diametrically opposite the distorted portion.

2. A device for repairing tires comprising means to distort the tire to expose the defective portion, and means engaging the exterior of the tire only to hold it in distorted position.

3. A device for repairing tires comprising means to distort the tire to expose the defective portion, and means to hold said tire in such position through its own resiliency.

4. A device for repairing tires comprising means to distort the tire to expose the defective portion, and means adapted to engage the tire to hold it in such position through its own resiliency.

5. A device for repairing tires comprising means to distort the tire to expose the defective portion and means adapted to engage the exterior of the tire to hold it in such possition through its own resiliency.

6. A device for repairing tires comprising a block against which the tire may be pressed to expose the defective portion, and means acting on the tire to hold it in such position through its own resilience.

7. A device for repairing tires comprising means having an annular face against which the tire may be pressed to expose the defective portion, and means acting on the tire to hold it in such position through its own resilience.

In testimony whereof I have signed my name to the above specification.

WILLIAM PROCKNOW.